April 10, 1962     A. F. GOBB     3,029,084
SPARK PLUG GASKET
Filed April 21, 1959     2 Sheets-Sheet 2
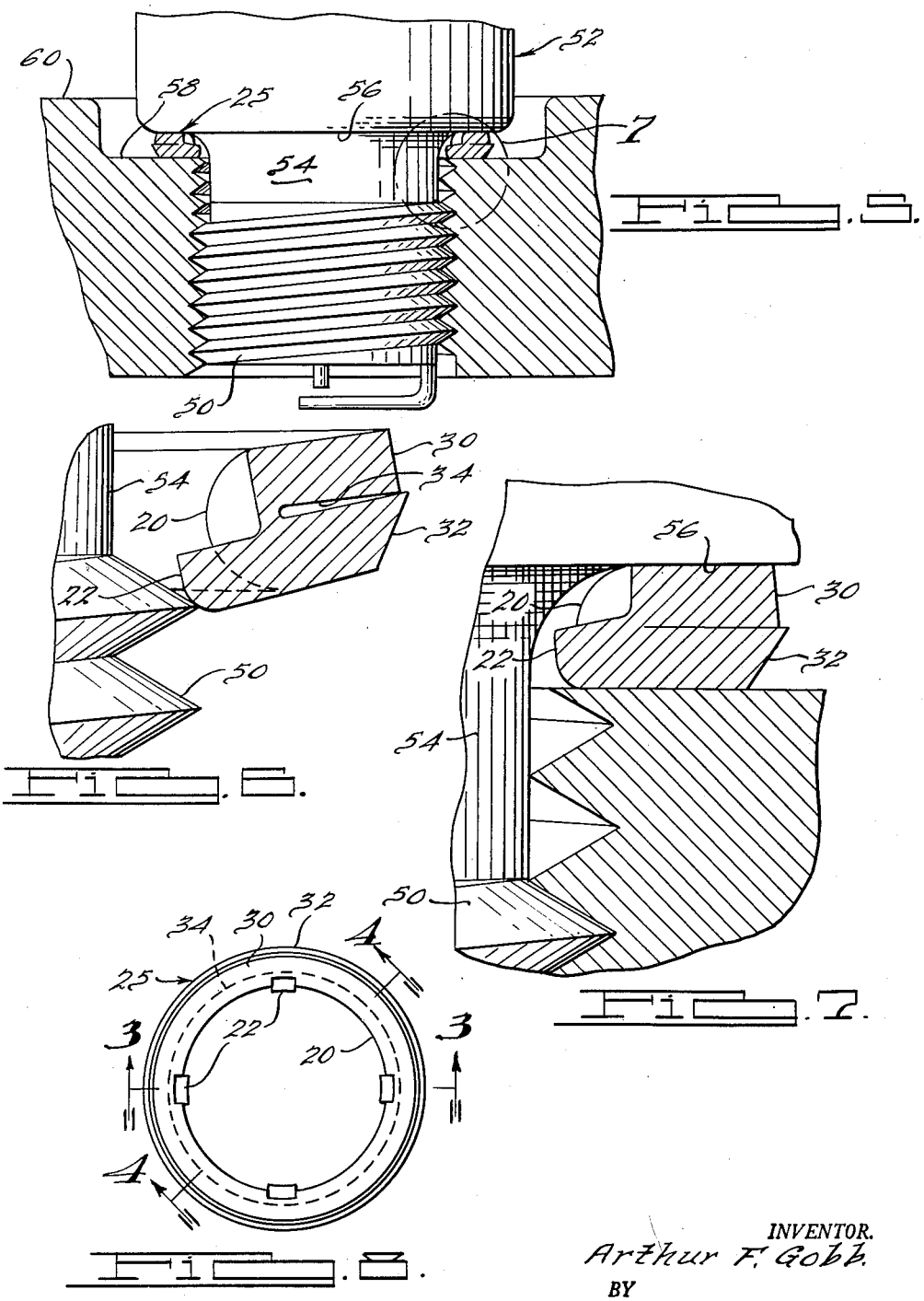
INVENTOR.
Arthur F. Gobb.
BY
Balluff and McKinley
ATTORNEYS.

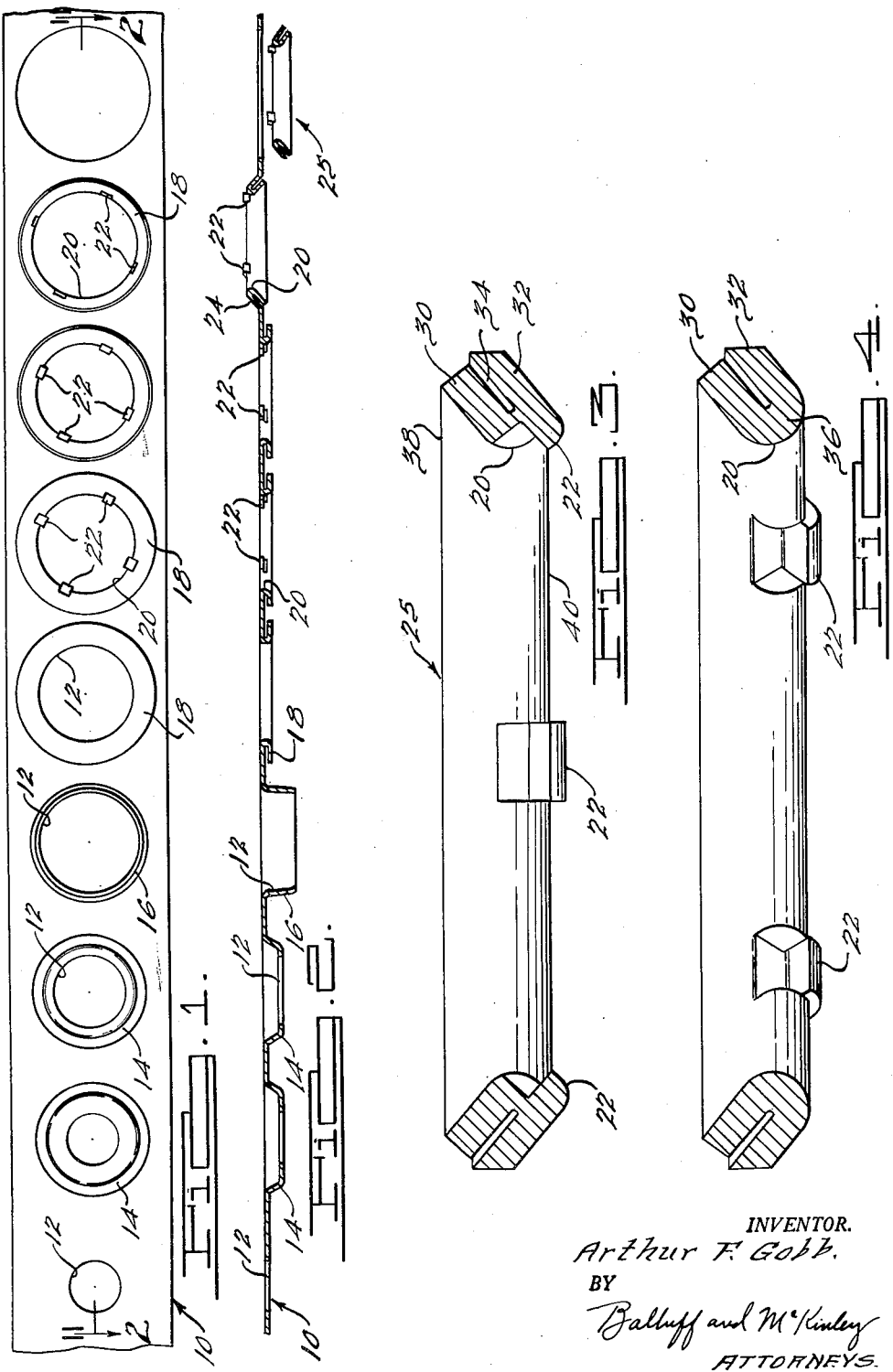

United States Patent Office 3,029,084
Patented Apr. 10, 1962

3,029,084
SPARK PLUG GASKET
Arthur F. Gobb, Grosse Ile, Mich., assignor to McCord Corporation, Detroit, Mich., a corporation of Maine
Filed Apr. 21, 1959, Ser. No. 807,786
3 Claims. (Cl. 277—215)

This invention relates to a spark plug gasket of the type adapted to provide a seal between a spark plug and the cylinder head of an internal combustion engine, the gasket being placed on the threaded end of the plug and compressed between the cylinder head and a downwardly facing shoulder on the plug as the plug is threaded into the cylinder head. The invention is more particularly directed to a gasket of this type of novel construction so that it can be readily slipped over the threaded end of the spark plug and then partially compressed to lock the gasket on the plug and form an assembly of the gasket and plug.

Gaskets are conventionally employed to provide a seal between the spark plugs and the cylinder block of an engine. Such gaskets are usually of a size to freely fit over the end of the plug but, if the plug is supplied by the manufacturer with the gasket in place on the plug, the gasket is quite apt to slip off of the end of the plug before the plug is assembled into the cylinder head. The workmen who assemble the plugs into the engine will frequently carelessly insert a plug which does not have a gasket thereon. The present invention provides a gasket which is simple in construction and very economical to manufacture and which can be locked onto the end of the plug so as to provide an assembly of the plug and gasket, thereby insuring that each plug will have a gasket thereon to provide the necessary seal. My improved gasket may be removed from the plug by threading the gasket off of the plug in the event that the plug is removed from the engine for cleaning or the like. However, the gasket is not initially threaded onto the plug but is merely slipped over the threads on the plug and then locked onto the stem of the plug above the threads by a simple operation, thereby saving the labor cost and time that would be required to assemble a gasket of this type onto a plug by a threading operation.

A principal object of the invention is to provide a new and improved spark plug gasket.

A further object of the invention is to provide a spark plug gasket constructed so that it may be freely slipped over the threaded end of a spark plug and thereafter locked onto the plug to provide an asesmbly of the plug and gasket with no possibility of the gasket accidentally becoming disengaged from the plug.

Another object of the invention is to provide a spark plug gasket having integral locking projections adapted to lock the gasket on the plug upon partial compression of the gasket.

Other and further objects of the invention will be apparent from the following description and claims and may be understood by reference to the accompanying drawings, of which there are two sheets, which by way of illustration show a preferred embodiment of the invention and what I now consider to be the best mode of applying the principles thereof. Other embodiments of the invention may be used without departing from the scope of the present invention as set forth in the appended claims.

In the drawings:

FIG. 1 is a bottom plan view of a strip of metal illustrating the sequence of operations performed thereon to produce the gasket of this invention;

FIG. 2 is a sectional view taken on line 2—2 of FIG. 1;

FIG. 3 is an enlarged sectional view of the gasket taken on line 3—3 of FIG. 8;

FIG. 4 is an enlarged sectional view of the gasket taken on line 4—4 of FIG. 8;

FIG. 5 is an enlarged sectional view showing the assembly of the spark plug, the gasket and the cylinder head into which the plug is threaded;

FIG. 6 is a fragmentary enlarged sectional view showing the gasket in its partially compressed condition in which it is locked onto the threaded end of the plug;

FIG. 7 is an enlarged fragmentary sectional view showing the gasket in its compressed condition; and FIG. 8 is an enlarged plan view of the gasket after it has been compressed.

The gasket may be made from a strip 10 of metal stock in the manner shown in FIGS. 1 and 2, which illustrate the several operations performed on successive portions of the stock as it is advanced through the forming dies. The metal stock advances from left to right, as viewed in FIGS. 1 and 2, and is first blanked out to provide a hole 12. At the next station the stock is deformed downwardly around the hole 12 to provide a dished portion 14. The stock is then further deformed to enlarge the aperture 12 and at the subsequent station the portion 14 is further deformed to define a tubular neck 16. The neck 16 is then deformed laterally so as to be bent back parallel to the plane of the stock to provide a laterally extending flange 18 spaced from and substantially parallel to the remainder of the stock. The hole 12 is enlarged by the formation of the tubular neck 16 and the flange 18 to the final size that it will have in the completed gasket.

The metal stock defining the inner periphery 20 of the completed gasket is then sheared in an axial direction at a plurality of spaced points around the periphery 20 to provide a series of integral locking projections 22, four of such locking projections being illustrated, although a greater or lesser number may be employed as desired. After the locking projections 22 have been formed, the stock surrounding the opening is deformed into the conical shape indicated at 24 in FIG. 2. The completed gasket 25 is then blanked out as the strip advances to the next station.

As shown in FIGS. 3 and 4, the gasket 25 comprises a conical ring portion 30 and an outer conical ring portion 32 parallel to and spaced from the ring portion 30 by a narrow gap 34. The inner and outer ring portions 30 and 32 are joined at their smaller diameter ends by a rounded connection portion 36. The locking projections 22 are formed by shearing the metal of the connecting portion 36 in an axial direction from the larger diameter end face 38 of the gasket. The projections 22 project axially beyond the opposite end face 40 of the gasket and, as shown in FIG. 3, the projections 22 extend substantially in the plane of and in effect form extensions of the outer conical ring portion 32.

The inclination of the conical portions 30 and 32 is such that the locking projections 22 do not project radially inwardly of the inner periphery of the gasket defined by the connecting portion 36. As shown in the drawings, the portions 30 and 32 are inclined at an angle of about 40° to the plane of the gasket, although the angle of inclination might be varied so long as the projections 22 do not extend any appreciable distance inwardly of the inner periphery of the gasket.

The inner periphery of the gasket is of such size as to slip freely over the threaded end 50 of the spark plug 52 with which it is to be used. The plug 52 is of conventional construction and includes a stem portion 54 above the threaded portion 50 and a downwardly facing shoulder 56 for compressing the gasket between the shoulder 56 and the counterbore 58 in the cylinder head 60.

After the gasket has been slipped over the threads 50 of the plug 52, the gasket is partially compressed, as shown in FIG. 6, so as to draw the projections 22 radially inwardly beyond the outside diameter of the threads 50 so that the gasket is locked in place around the stem 54 of the plug so that it cannot accidentally become dislodged. The gasket in its partially compressed condition can be removed from the plug by unthreading the same past the threads 50. Thus the plug may be supplied by the plug manufacturer with the gasket assembled and locked thereon to eliminate any possibility of a plug being installed in an engine without the necessary gasketing.

When the plug is threaded into the cylinder head the gasket is further compressed, as shown in FIG. 7, in which the two rings sections 30 and 32 are compressed against each other, thereby deforming the metal to some extent. The resiliency of the stock from which the gasket is made will provide the required compression seal between the plug and the cylinder head. FIG. 8 illustrates the gasket after it has been partially or fully compressed and illustrates the locking projections 22 projecting radially inwardly from the inner periphery 20 of the gasket to lock the gasket onto the threaded end of the plug.

When the plug is removed for servicing, it will generally be advisable to replace the gasket if the plug is to be used again, and the compressed gasket may be threaded off of the end of the plug and a new gasket installed by slipping the same over the end of the plug and then partially compressing the gasket to the condition illustrated in FIG. 6.

It will be seen that the gasket described herein is very simple in construction and economical to manufacture but possesses advantages over present gasket constructions of this type since it may be freely slipped onto the plug with which it is to be used and then locked in place by a simple operation to provide a plug and gasket assembly which insures that each plug will be properly gasketed upon installation of the plug into the engine.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A spark plug gasket adapted for assembly with a spark plug having a threaded end, comprising an annular piece of metal bent back upon itself to define substantially parallel, spaced conical ring portions, said ring portions being joined at their inner ends by a rounded connecting portion which defines the inner periphery of the gasket, the metal of said connecting portion being sheared in an axial direction at spaced intervals around the inner periphery of said gasket to define a series of integral locking projections, said locking projections lying substantially in the plane of and forming radially inwardly disposed extensions of one of said ring portions, said ring portions being inclined at an angle to the plane of the gasket with said locking projections forming extensions of the outer ring portion, the inclination of said ring portions being such that the ends of said locking projections do not project radially inwardly of the inner periphery of the gasket, said inner periphery being of a size to freely slide over the threaded end of the spark plug to which it is to be assembled, the metal of said gasket having sufficient resilience to enable flattening of the conical ring portions thereby to draw said locking projections radially inwardly of the inner periphery of the gasket to prevent removal of the gasket from the threaded end of the spark plug except by threading the gasket off of the plug.

2. A spark plug gasket comprising an annular metal member bent back upon itself to define substantially parallel, spaced conical ring portions, said ring portions being joined at their smaller diameter ends by a rounded connecting portion which defines the inner periphery of the gasket, and a series of integral locking projections spaced around the inner periphery of said gasket, said locking projections consisting of metal sheared from said connecting portion, said locking projections projecting axially beyond the smaller diameter end face of the gasket so as not to project radially inwardly of the inner periphery of the gasket, said inner periphery being of a size to freely slide over the threaded end of the spark plug to which it is to be assembled, the metal of said gasket having sufficient resilience to enable flattening of the conical ring portions thereby to draw said locking projections radially inwardly of the inner periphery of the gasket to prevent removal of the gasket from the threaded end of the spark plug except by threading the gasket off of the plug.

3. A spark plug gasket adapted for assembly with a spark plug having a threaded end and an undercut portion inwardly of said threaded end, comprising an annular metal member bent back upon itself to define substantially parallel spaced deformable ring portions, said ring portions being joined at their inner peripheries by a rounded connecting portion which defines the inner periphery of the gasket, a series of integral generally radially extending locking projections spaced around the inner periphery of said gasket, said locking projections consisting of metal sheared in an axial direction from said connecting portion, said inner periphery of said gasket being of a size to slide freely over the threads of the plug on which it is assembled and said locking projections being receivable in said undercut portion behind the threads of the plug to prevent removal of the gasket except by threading the gasket off of the plug, the metal of said gasket having sufficient resilience and the shape of said ring portions being such as to enable flattening of said ring portions after the gasket is assembled onto the plug to provide a seal between the plug and the surface against which it is seated.

References Cited in the file of this patent

UNITED STATES PATENTS 2,296,332    Bowers _____ Sept. 22, 1942

FOREIGN PATENTS 356,444    Italy _____ Feb. 1, 1938